United States Patent [19]

Graham et al.

[11] Patent Number: 5,351,270
[45] Date of Patent: Sep. 27, 1994

[54] PORTABLE CELLULAR TELEPHONE USING SPREAD SPECTRUM COMMUNICATION WITH MOBILE TRANSCEIVER

[75] Inventors: Hatch Graham, Fremont, Calif.; Charles Moses, Catonville; Leonard Schuchman, Potomax, both of Md.; Ronald Bruno, Arlington, Va.

[73] Assignee: Stanford Telecommunications, Inc., Santa Clara, Calif.

[21] Appl. No.: 64,629

[22] Filed: May 20, 1993

[51] Int. Cl.$^5$ ............................................. H04L 27/30
[52] U.S. Cl. ............................................. 375/1; 380/34; 379/56; 379/58; 379/59; 379/61; 455/33.1; 455/53.1; 455/54.1
[58] Field of Search ............... 375/1; 380/34; 379/56, 379/58-61; 455/33.1, 53.1, 54.1, 56.1

[56] References Cited

U.S. PATENT DOCUMENTS

| | | |
|---|---|---|
| 4,456,793 | 6/1984 | Baker et al. ............................ 379/56 |
| 4,659,878 | 4/1987 | Dinkins ................................... 379/60 |
| 4,989,230 | 1/1991 | Gillig et al. ............................. 379/59 |
| 5,115,463 | 5/1992 | Moldavsky et al. ................... 379/58 |

*Primary Examiner*—Bernarr E. Gregory
*Attorney, Agent, or Firm*—Townsend and Townsend Khourie and Crew

[57] ABSTRACT

A portable cellular telephone system including a stationary transceiver for radio communication with a plurality of mobile transceivers within a geographic cell, a mobile transceiver within said geographic cell and having sufficient power to communicate with said stationary transceiver, and a portable transceiver of limited size for personal transport and use. The portable transceiver communicates with the mobile transceiver by spread spectrum techniques, and the mobile transceiver communicates with the stationary transceiver by frequency modulated radio transmission or by digital radio transmission.

6 Claims, 1 Drawing Sheet

PORTABLE CELLULAR TELEPHONE USING SPREAD SPECTRUM COMMUNICATION WITH MOBILE TRANSCEIVER

BACKGROUND OF THE INVENTION

This invention relates generally to cellular telephone systems, and more particularly the invention relates to a portable cellular telephone with increased transmission power and interference immunity while retaining a small compact size.

Cellular radio telephone systems have become commonplace in most metropolitan areas in the United States. Car phones include transceivers for communicating by FM radio with a stationary transmitter and receiver within the geographic area (cell) in which the car is located. The stationary transceiver provides a link between the mobile car phone and the local public telephone system.

Hand-held portable cellular telephones are available which can be carried by an individual for communication with the local telephone system via the stationary transceiver. Batteries are provided in the hand set, thus power is limited to a few hundred milliwatts. A transportable cellular telephone with three watts of power is also available. Typically the transceiver and batteries are housed in a hand-held satchel to which a telephone handset is connected by a cord.

The present invention is directed to providing a portable cellular telephone which can be accommodated in a handset without the requirement for a separate satchel for the transceiver and power package but with increased transmission quality and higher transmission power.

SUMMARY OF THE INVENTION

In accordance with the invention a hand-held portable cellular telephone is provided which interfaces with a transceiver in an automobile, for example, for communicating with a stationary cell transceiver and a local public telephone system. So long as the hand-held telephone is within an operable range including the automobile transceiver, the hand-held unit can utilize the automobile transceiver in communicating in the local public telephone system and thus can function with much less power requirements than the conventional transportable cellular telephone, thus obviating the need for the satchel.

In accordance with a feature of the invention, the hand-held unit and the automobile unit communicate using spread spectrum transmission in which the requisite transmission power is spread over carrier frequencies across a frequency band, thereby using the Instrumentation, Scientific and Medical (ISM) frequency bands allocated by the Federal Communications Commission (FCC) for unlicensed use by spread spectrum systems.

The invention and objects and features thereof will be more readily apparent from the following detailed description and appended claims when taken with the drawing.

DESCRIPTION OF SPECIFIC EMBODIMENTS

Figure 1:
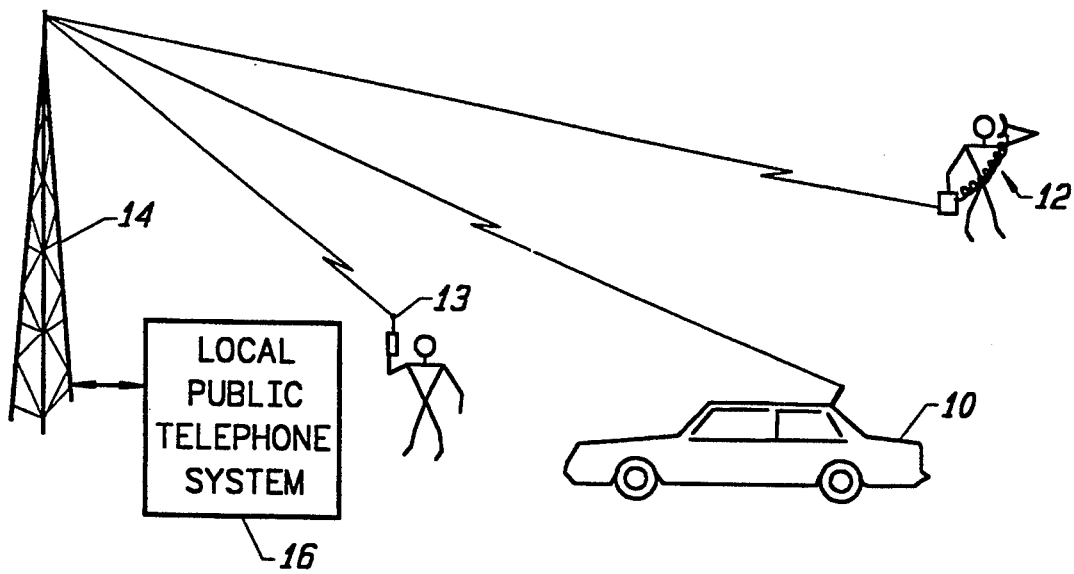
FIG. 1 is a schematic diagram of a conventional cellular telephone system including mobile and portable telephone units.

Referring now to the drawing, FIG. 1 is a schematic diagram of the conventional cellular telephone system. A mobile transceiver in an automobile 10, a transportable transceiver 12 carried by an individual 3, and a portable hand-held transceiver 13 carried by an individual, communicate directly with a stationary transceiver 14 located in the area or cell in which the mobile and portable units are located. Transceiver 14 then interfaces with a local public telephone system 16.

The power requirement for communicating directly with the stationary transceiver 14 anywhere in a physical cell is readily accommodated in the automobile 10. The transceiver for the transportable unit 12 is of such size that it must be housed in a satchel which is transported by an individual with the handset connected to the satchel by a cord. Such a system is bulky and awkward in operation. The limited power of the portable, hand-held unit 13 severely affects transmission quality and performance range.

Figure 2:
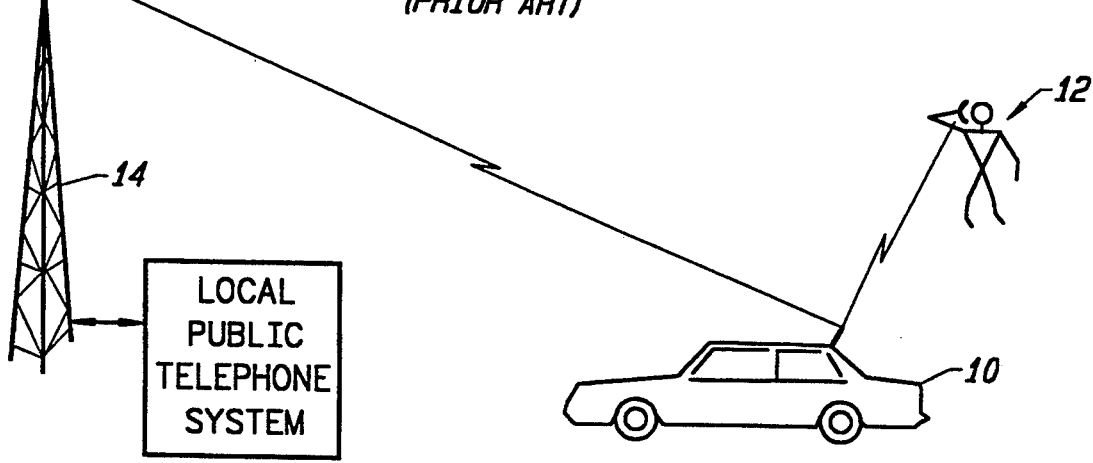
FIG. 2 is a schematic diagram of a cellular telephone system including mobile and portable telephone units in accordance with the invention.

In accordance with the present invention the power requirements of the portable unit 13 are reduced by having the portable unit communicate through the transceiver of the mobile unit 10 with the stationary transceiver 14 as shown in FIG. 2. This requires that the portable unit is within a reasonable distance (e.g., one mile) of the mobile unit 10 which might by located, for example, at a golf course parking lot with the portable unit being carried by a golfer.

Figure 3:
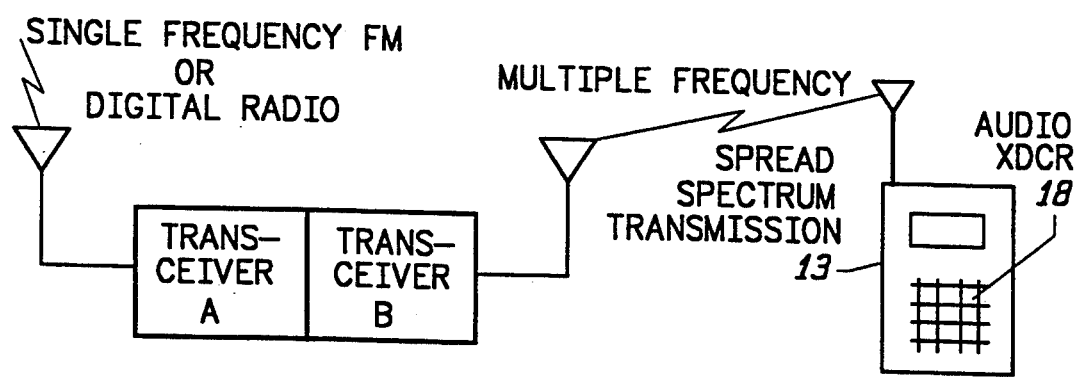
FIG. 3 is a functional block diagram of the RF transmission portion of the system of FIG. 2.

In accordance with the invention the communication between the mobile unit 10 and the portable unit 13 including an audio transducer 18 is spectrally accommodated by using spread spectrum transmission as illustrated in FIG. 3. The Federal Communications Commission (FCC) has allocated Instrumentation, Scientific and Medical (ISM) frequency bands in the U.S. for unlicensed use by spread spectrum systems. Accordingly, by communicating in an ISM band, communication between the mobile unit and the portable unit is readily accommodated. The spread spectrum signaling permits many users with reduced interference in the same geographic area or cell. The FCC specifications for the ISM bands include a maximum transmitter power of 1 watt. This accommodates a reasonable transmission range of 1 mile between the portable unit and the mobile unit.

The mobile unit 10 has a spread spectrum transceiver B for communicating with the portable unit 13 and an FM transceiver A for communicating with the stationary transceiver 14 over an FM frequency band. Alternatively, transceiver A can be a digital radio transceiver should cellular telephone convert from FM to digital communications.

There has been described a cellular telephone system including a portable hand-held transceiver which communicates in the system through a mobile transceiver to increase transmission quality, range, and performance. While the invention has been described with reference to specific embodiments, the description is illustrative of the invention and is not to be construed as limiting the invention. For example, the mobile transceiver can communicate with the stationary transceiver using digital transmission techniques. Thus, various modifications and applications may occur to those skilled in the art without departing from the true spirit and scope of the invention as defined by the appended claims.

What is claimed is:

1. A portable cellular telephone system comprising:
    a stationary transceiver for radio communication with a plurality of mobile transceivers within a geographic cell;
    a mobile transceiver within said geographic cell and having sufficient power to communicate with said stationary transceiver; and
    a portable transceiver for personal transport and use, said portable transceiver having sufficient power for radio communication with said mobile transceiver when located within a limited distance of said mobile transceiver but insufficient power to communicate directly with said stationary transceiver, said mobile transceiver providing a radio link between said portable transceiver and said stationary transceiver,
    said portable transceiver communicating with said mobile transceiver by spread spectrum communication using frequency bands allocated for unlicensed use.

2. The portable cellular telephone system as defined by claim 1 wherein said mobile transceiver communicates with said stationary transceiver by frequency modulation communication.

3. The portable cellular telephone system as defined by claim 1 wherein said mobile transceiver communicates with said stationary transceiver by digital radio communication.

4. In a portable cellular telephone system, a method of radio communication between a portable hand-held transceiver and a stationary transceiver in a geographic cell comprising the steps of:
    providing an intermediate mobile transceiver within a limited distance of said portable transceiver for communicating with said portable transceiver and having sufficient power to communicate with said transceiver;
    transmitting first radio waves between said mobile transceiver and portable transceiver; and
    transmitting second radio waves between said mobile transceiver and said stationary transceiver by spread spectrum broadcast using frequency bands allocate for unlicensed use, whereby information transmitted from said portable transceiver is received by said mobile transceiver and retransmitted to said stationary transceiver.

5. The method as defined by claim 4 wherein said second radio waves are transmitted by frequency modulated broadcast.

6. The method as defined by claim 4 wherein said second radio waves are transmitted by digital radio broadcast.

* * * * *